United States Patent
Takeuchi (10) Patent No.: US 8,699,070 B2
(45) Date of Patent: Apr. 15, 2014

(54) CONTROL METHOD FOR REPLACING DATA RENDERING BLOCKS OF WHITE SPACE WITH PAPER FEED COMMANDS

(75) Inventor: Yasuhiro Takeuchi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 238 days.

(21) Appl. No.: 13/316,892

(22) Filed: Dec. 12, 2011

(65) Prior Publication Data

US 2012/0176644 A1   Jul. 12, 2012

(30) Foreign Application Priority Data

Jan. 6, 2011   (JP) .................................. 2011-000988

(51) Int. Cl.
*G06K 15/02* (2006.01)
(52) U.S. Cl.
USPC ........................................................ 358/1.15
(58) Field of Classification Search
USPC ........................................................ 358/1.15
See application file for complete search history.

(56) References Cited

U.S. PATENT DOCUMENTS

| | | | |
|---|---|---|---|
| 6,016,205 A * | 1/2000 | Silverberg et al. | 358/1.6 |
| 2005/0046900 A1* | 3/2005 | Nakamori | 358/1.18 |
| 2009/0316162 A1 | 12/2009 | Watanabe et al. | |
| 2010/0220163 A1* | 9/2010 | Ohkubo | 347/102 |
| 2010/0275114 A1* | 10/2010 | Bastos dos Santos et al. | 715/228 |

FOREIGN PATENT DOCUMENTS

| | | | | |
|---|---|---|---|---|
| EP | 0 507 571 | * | 7/1992 | G06F 5/06 |
| JP | 08-046749 A | | 2/1996 | |
| JP | 2010-000623 A | | 1/2010 | |

* cited by examiner

*Primary Examiner* — Qian Yang (57) ABSTRACT

A recording system has a recording device that records recording data sent from a host computer to a recording medium. The host computer has a division control unit that divides recording data to be recorded into plural blocks of recording data, and a transmission control unit that sequentially transmits the blocks of divided recording data. The recording device has a reception unit that stores the transmitted blocks of recording data to a receive buffer in the order received, and a recording control unit that records the received blocks of recording data to the recording medium. The dividing position where the division control unit divides the recording data to be recorded is a position where white space data is contained in the recording data to be recorded.

6 Claims, 4 Drawing Sheets

CONTROL METHOD FOR REPLACING DATA RENDERING BLOCKS OF WHITE SPACE WITH PAPER FEED COMMANDS

CONTINUING APPLICATION DATA

The entire disclosure of Japanese Patent Application No: 2011-000988, filed Jan. 6, 2011 is expressly incorporated by reference herein.

BACKGROUND

1. Technical Field

The present invention relates to a recording system having a recording device that records on a recording medium, to a recording control device that controls the recording device, and to a control method.

2. Related Art

If data transfer does not keep pace with the recording operation while receiving the data to be recorded in a printer or other recording device, the recording device interrupts recording, waits, and resumes recording after the next batch of data is received. See, for example, Japanese Unexamined Patent Appl. Pub. JP-A-H08-46749.

When recording starts and stops as in the recording device according to the related art, the position where recording stops can shift from the position where recording resumes due, for example, to gear backlash in the conveyance function or deformation of the paper feed rollers, resulting in white bands being formed in the data recorded on the recording medium and a drop in recording quality. This problem is not limited to use of communication lines such as described in JP-A-H08-46749, and can occur easily when the communication speed allowed by the communication interface is low when sending data to a recording device from an external device through an interface such as an RS-232C interface. However, changing the communication interface or increasing the communication speed using non-standard methods is not easy considering the need for compatibility with other devices and general usability. In some cases, the problem can therefore not be solved simply by faster communication.

SUMMARY

A recording device according to the invention receives and records recording data sent from an external source, and prevents a drop in recording quality caused by interrupting recording.

A first aspect of the invention is a recording system including a host computer and a recording device that records recording data sent from the host computer to a recording medium. The host computer has a division control unit that divides recording data to be recorded into plural blocks of recording data, and a transmission control unit that sends the blocks of recording data divided by the division control unit to the recording device. The recording device has a reception unit that stores the blocks of recording data sent from the host computer to a receive buffer in the order received, and a recording control unit that acquires the recording data of blocks that have been completely received from the receive buffer, and records the acquired blocks of recording data to the recording medium. The dividing position where the division control unit divides the recording data to be recorded being a position where white space data is contained in the recording data to be recorded.

This aspect of the invention divides the recording data to be recorded into plural blocks at white space (white space data), and sends the recording data by block unit from the host computer to the recording device. As a result, even if the recording data is not received in time and the recording device interrupts recording and waits, the position where recording pauses is in white space, and there is therefore no drop in recording quality. More specifically, because the position where the recording device interrupts recording is a position where there is white space in the document to be recorded, white lines, for example, will not be apparent even if the position where recording resumes shifts from the position where recording paused. As a result, a drop in recording quality can be prevented even if the recording operation is interrupted because the communication speed is slow, for example.

In a recording system according to another aspect of the invention, when the amount of data in a block of recording data is greater than an amount of data that is previously set based on the storage capacity of the receive buffer of the recording device, the division control unit further divides the block of recording data into a plurality of second blocks of recording data.

In this aspect of the invention a block that was divided at white space is further divided into a plurality of blocks of a size appropriate to the receive buffer, such as a size that can be received in a short time, for example, based on a data size that is predetermined based on the size of the receive buffer. Because the size of these redivided blocks is small and the recording device can quickly receive and store both the recording data and recording commands in the receive buffer, the recording device does not need to wait to receive the next block of data, and can continue recording without interruption. As a result, when the print document contains few white spaces and can only be divided into a few blocks, for example, the size of one block becomes larger but can be recorded without interruption. The recording operation can therefore be interrupted less frequently, and a drop in recording quality can be prevented.

When a block of recording data is divided into the second blocks of recording data in a recording system according to another aspect of the invention, the division control unit divides the block so that the data size of the second blocks of recording data decreases in the order in which the second blocks of recording data are transmitted.

When the recording device in this aspect of the invention receives recording data and recording commands for subsequent blocks while recording the recording data in the receive buffer in this aspect of the invention, reception can be completed quickly and the recording data and recording commands can be reliably stored in the receive buffer because it takes a long time to complete recording the first block because of its large size, and the following blocks become successively smaller. As a result, the block that was created first can be recorded without interruption.

In a recording system according to another aspect of the invention, the recording device includes a paper feed mechanism that conveys the recording medium, and a line head disposed perpendicularly to the conveyance direction of the recording medium by the paper feed mechanism, and records by means of the line head on the recording medium while conveying the recording medium by means of the paper feed mechanism; and the dividing position where the division control unit divides the recording data to be recorded is a position where white space data is aligned in the same direction as the line head.

With this aspect of the invention, a drop in recording quality due to interruption of recording does not happen when recording by means of a line head while conveying the recording medium because the position where recording stops when the recording device interrupts recording is at white space parallel to the line head.

In a recording system according to another aspect of the invention, the recording device is configured to record to the recording medium by scanning the recording head in a different direction than the conveyance direction of the recording medium; and the dividing position where the division control unit divides the recording data to be recorded is a position where white space data is contained in the recording data to be recorded in the scanning direction of the recording head.

A drop in recording quality due to interruption of recording does not happen with this aspect of the invention because recording stops at a position over white space in the scanning direction when a recording device that records by scanning a recording head perpendicularly to the conveyance direction of the recording medium interrupts recording.

Another aspect of the invention is a recording control device that controls a recording device that records on a recording medium, including: a division control unit that divides recording data to be recorded into plural blocks of recording data; and a transmission control unit that sequentially sends the blocks of recording data divided by the division control unit to the recording device; the dividing position where the division control unit divides the recording data to be recorded being a position where white space data is contained in the recording data to be recorded.

By controlling a recording device by means of the recording control device according to this aspect of the invention, the recording data to be recorded is divided into plural blocks at white space, and the recording data is sent by block unit from the host computer to the recording device. As a result, even if the recording data for an entire block is not received in time and the recording device interrupts recording and waits until reception is completed, the position where recording pauses is a position where there is white space, and there is therefore no drop in recording quality. As a result, a drop in recording quality can be prevented even if the recording operation is interrupted because the communication speed is slow, for example.

Another aspect of the invention is a program that can be run by a computer that controls a recording device that records on a recording medium, the program causing the computer to function as a division control unit that divides recording data to be recorded into plural blocks of recording data by dividing the recording data to be recorded at a position where white space data is contained in the recording data to be recorded, and a transmission control unit that sends the blocks of recording data divided by the division control unit to the recording device.

By controlling a recording device by running the program according to this aspect of the invention, the recording data to be recorded is divided into plural blocks at white space, and the recording data is sent by block unit from the host computer to the recording device. As a result, even if the recording data for an entire block is not received in time and the recording device interrupts recording and waits until reception is completed, the position where recording pauses is a position where there is white space, and there is therefore no drop in recording quality. As a result, a drop in recording quality can be prevented even if the recording operation is interrupted because the communication speed is slow, for example.

Another aspect of the invention is a control method for a recording system including a host computer, and a recording device that records recording data sent from the host computer to a recording medium, the control method including steps of: dividing recording data to be recorded into plural blocks of recording data on the host computer, and sending the divided blocks of recording data to the recording device; and storing the blocks of recording data sent from the host computer to a receive buffer of the recording device in the order received, acquiring recording data of blocks that have been completely received from the receive buffer, and recording the acquired blocks of recording data to the recording medium; the dividing position where the recording data to be recorded is divided being a position where white space data is contained in the recording data to be recorded.

Because the recording data to be recorded is divided into plural blocks at white space, and the recording data is sent by block unit from the host computer to the recording device, there is no drop in recording quality with the control method for a recording system according to this aspect of the invention even if the recording data for an entire block is not received in time and the recording device interrupts recording and waits until reception is completed because the position where recording pauses is a position where there is white space. As a result, a drop in recording quality can be prevented even if the recording operation is interrupted because the communication speed is slow, for example.

By dividing the print document into plural blocks where there is white space, and sending recording data and recording commands in block units to the recording device, the invention prevents a drop in recording quality even if the recording device interrupts recording to wait for data.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
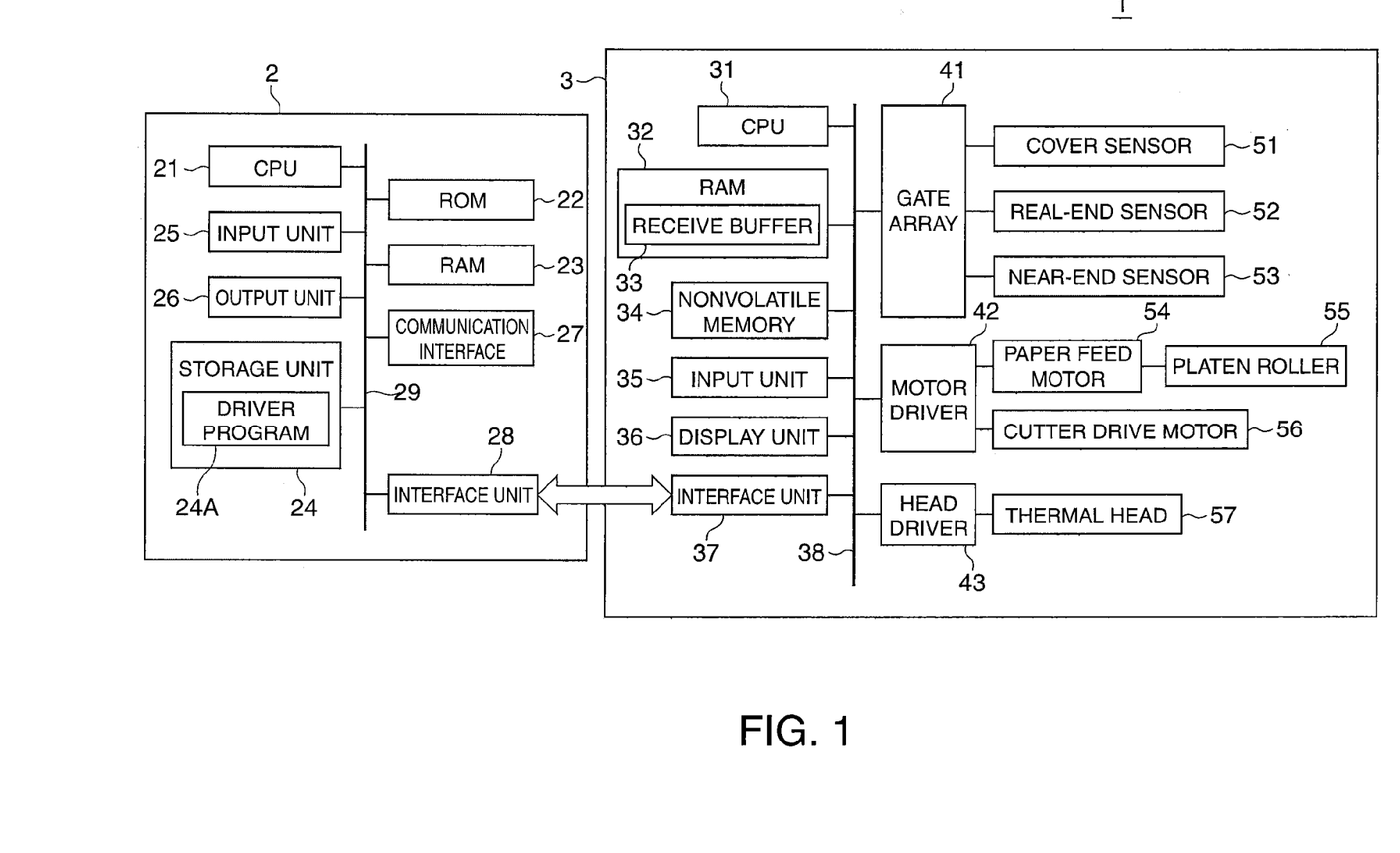
FIG. 1 is a block diagram showing the configuration of a recording system according to a preferred embodiment of the invention.

FIG. 1 is a function block diagram of a recording system 1 according to an embodiment of the invention.

As shown in FIG. 1, the recording system 1 includes a host computer 2 as a recording control device, and a printer 3 as a recording device.

The host computer 2 includes a CPU 21 that renders functions including controlling the printer 3 by executing a basic control program and controlling other parts; ROM 22 that stores data and the basic control program run by the CPU 21; RAM 23 used as working memory that temporarily stores data and programs run by the CPU 21; an input unit 25 that is connected to a keyboard, mouse, or other input device, detects operation of the input devices, and outputs operating signals corresponding to the operations to the CPU 21; an output unit 26 that is connected to a display or other output device, and outputs results of processes run by the CPU 21, and input content from the input unit 25, to an output device; a storage unit 24 that stores application programs run by the CPU 21 and data related to the programs; a communication interface 27 that is connected to an external communication network, and communicates information through the communication network; and an interface unit 28 connected to the printer 3. These different parts are interconnected by a bus 29.

The interface unit 28 includes a connector (not shown in the figure) conforming to a particular standard such as RS-432C or USB, and an interface circuit (not shown in the figure) that exchanges signals with the printer 3 through a connection cable (not shown in the figure) connected to the connector. The interface unit 28 could also be configured as a wireless communication interface including an RF circuit and an antenna, but in this embodiment of the invention enables wired communication through a connection cable by way of example.

When data to be sent to the printer 3 is input from the CPU 21, the interface unit 28 encodes and packetizes the input data according to the protocol of the implemented standard, and sends the resulting packets to the printer 3. The interface unit 28 also interprets packets received from the printer 3, decodes the data contained in the payload of the packets, and outputs the decoded data to the CPU 21.

The host computer 2 stores the driver program 24A that is run by the CPU 21 in storage unit 24 readable by the CPU 21. The driver program 24A is a program for controlling the printer 3 and recording (printing).

Based on operation signals input from the input unit 25 or a basic control program previously stored in ROM 22, the CPU 21 reads and runs the driver program 24A and controls printing by the printer 3.

By running the driver program 24A, the CPU 21 records the document (including when only images) generated by running an application program not shown stored in the storage unit 24. More specifically, the document to be recorded, the number of copies to record, the portion of the document to record, the color, font, and font size to record, the enlargement or reduction ratio when recording, the recording direction, and other parameters are specified by operation signals input from the input unit 25. When recording is instructed, the CPU 21 generates data for the document to be recorded (referred to as the "print document" below) by the printer 3 (the recording data to be recorded) by means of a function of the driver program 24A. Included in the print document data are additional information specifying the font and font size, for example, text and image data, and control codes for white space, tab characters, and line feeds. This recording data could be data for a single image having text and images arranged therein in specific sizes according to the additional information. The CPU 21 sends the generated recording data to the printer 3 with a recording command, which is a command telling the printer 3 to record the data. The CPU 21 receives the data sent from the printer 3 through the interface unit 28. Included in this data is a reception completion report indicating that receiving the recording data and recording commands sent by the interface unit 28 to the printer 3 was completed, and status information indicating the operating status of the printer 3.

The printer 3 includes a CPU 31 that runs firmware and controls parts of the printer 3 to execute a recording function; RAM 32 that temporarily stores data and the firmware run by the CPU 31; nonvolatile memory 34 that stores firmware run by the CPU 31 and related data; an input unit 35 that detects operation of switches or other input devices disposed on an operating panel (not shown in the figure) and outputs operation signals to the CPU 31; a display unit 36 that controls LEDs or a LCD panel in the operating panel, and displays the operating state of the printer 3, for example; and an interface unit 37 through which data is communicated with the recording system 1. These parts are connected to communicate with each other through a bus 38.

The printer 3 also has a gate array 41 that acquires the output detection values of sensors disposed to the printer 3, a motor driver 42 that drives the printer 3 motor, and a head driver 43 that drives the thermal head 57 as the recording head. These parts are also connected to the CPU 31 by the bus 38, and operate as controlled by the CPU 31.

A cover sensor 51 that detects if the printer 3 is open or closed is also connected to the gate array 41. Thermal roll paper is stored as the recording medium on which the printer 3 records inside the cover, and the output value of the cover sensor 51 changes when the cover is opened to add or replace the paper roll, for example.

A real-end sensor 52 and a near-end sensor 53 that detect how much roll paper is left are also connected to the gate array 41. The output value of the near-end sensor 53 changes when the amount of roll paper left in the roll paper compartment drops to or below a specific level. The near-end sensor 53 is disposed near the thermal head 57 on the upstream side, and is a sensor that detects if roll paper is present. Change in the output value of the near-end sensor 53 indicates that the amount of remaining paper that can be recorded on by the thermal head 57 is near zero. The gate array 41 detects and converts the output voltage of these sensors to digital data, and outputs to the CPU 31.

A paper feed motor 54 that turns the platen roller 55 and conveys the roll paper is connected to the motor driver 42. The motor driver 42 outputs a drive current and drive pulse to the paper feed motor 54, causing the paper feed motor 54 to turn only the amount controlled by the CPU 31 and advance the roll paper lengthwise.

A cutter drive motor 56 for a cutter unit (not shown in the figure) that cuts the roll paper after recording by the thermal head 57 is also connected to the motor driver 42. The motor driver 42 outputs drive current and drive pulses to the cutter drive motor 56 as controlled by the CPU 31 to cut the roll paper. The paper feed motor 54 and platen roller 55 render a paper feed mechanism.

The thermal head 57 is a line head having a plurality of heat elements arrayed perpendicularly to the conveyance direction of the roll paper. The head driver 43 controls energizing the heat elements of the thermal head 57, causing the heat elements to heat to a specific temperature and form colored dots on the roll paper.

By executing firmware, the CPU 31 receives and stores recording data and recording commands sent from the host computer 2 through the interface unit 37 to a receive buffer 33 in RAM 32 in the order received. The CPU 31 reads and converts the recording data from the receive buffer 33 into RAM 32 according to the recording commands in the receive buffer 33, arrays the text to be recorded on the roll paper at the specified position using the specified fonts, arranges images, and generates image data for recording on the roll paper. Based on this image data, the CPU 31 controls the motor driver 42 and head driver 43 to record while conveying the roll paper. When recording the image data is completed to the end of the print document, the CPU 31 controls the motor driver 42 to convey the roll paper and cut.

Using a function of the interface unit 37, the CPU 31 sends a reception completion report to the host computer 2 each time receiving the recording data and recording commands sent from the host computer 2 ends, and sends status information denoting the operating state of the printer 3 to the host computer 2 as needed. For example, when a no-paper state is detected by the near-end sensor 53, or when the cover sensor 51 detects that the cover is open, the printer 3 goes off-line and sends a status report indicating that the printer 3 is off-line.

The CPU 31 also sends a status report when the cover sensor 51 detects the cover closed and the printer 3 is on-line again.

The interface unit 28 of the host computer 2 and the interface unit 37 of the printer 3 include a connector (not shown in the figure) conforming to a particular standard such as RS-432C or USB, and an interface circuit (not shown in the figure) through which signals are exchanged through a connection cable (not shown in the figure) connected to the connector. The interface units 28 and 37 could also be configured as wireless communication interfaces including an RF circuit and an antenna, but in this embodiment of the invention enables wired communication through a connection cable by way of example only.

When data to be sent to the printer 3 is input from the CPU 21, the interface unit 28 encodes and packetizes the input data according to the protocol of the implemented standard, and sends the resulting packets to the printer 3. The interface unit 28 also interprets packets received from the printer 3, decodes the data contained in the payload of the packets, and outputs the decoded data to the CPU 21.

When data to be sent to the host computer 2 is input from the CPU 31, the interface unit 37 encodes and packetizes the input data according to the protocol of the implemented standard, and sends the resulting packets to the host computer 2. The interface unit 37 also interprets packets received from the host computer 2, decodes the data contained in the payload of the packets, and outputs the decoded data to the CPU 31.

When sending the data for the print document to the printer 3 in a recording system 1 thus comprised, the host computer 2 sends the data for the print document to the printer 3 in segments. One segment of data for a print document is called a "block." The host computer 2 sends the recording data and the recording commands in block units.

For example, if the amount of data contained in the print document exceeds the capacity of the receive buffer 33 of the printer 3, or if the amount of data in the print document exceeds the communication speed (the amount of data that can be sent per unit time) between the host computer 2 and the printer 3, the printer 3 must wait during the process of receiving and recording the data, possibly affecting the recorded output. This is described in further detail below.

Figure 2:
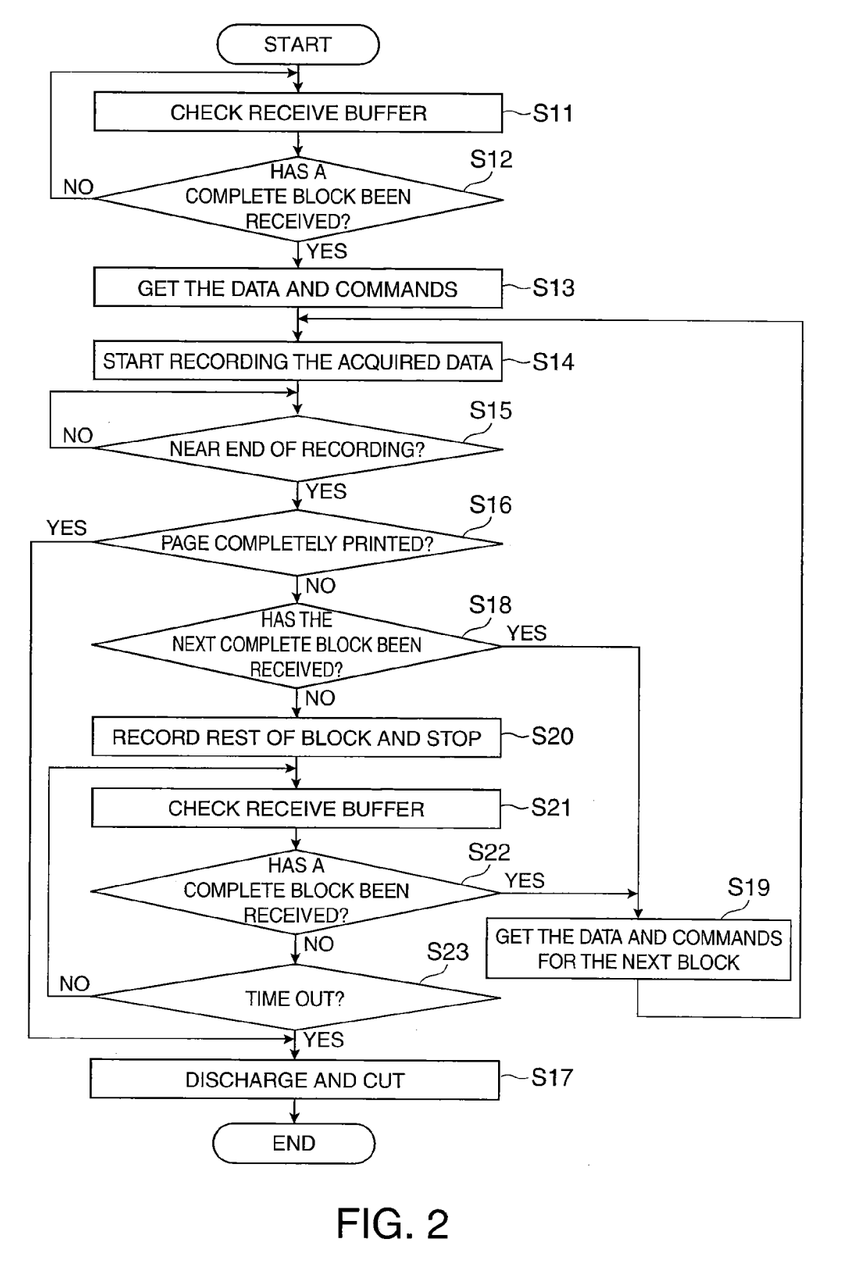
FIG. 2 is a flow chart of printer operation.

FIG. 2 is a flow chart of printer 3 operation.

The operation shown in FIG. 2 is achieved by the CPU 31 as a result of the CPU 31 running firmware from nonvolatile memory 34. The CPU 31 controlling the operation in FIG. 2 corresponds to a reception unit in conjunction with the interface unit 37, and to a recording control unit.

Before starting recording, the CPU 31 first checks the data in the receive buffer 33 (step S11), and determines if a block of data for which reception has been completed is in the receive buffer 33 (step S12). As described above, the host computer 2 sends the recording data and recording commands in blocks of print document data. A configuration that sends only the recording data from the host computer 2 to the printer 3 is also conceivable. The CPU 31 receives the recording data and recording commands in block units through the interface unit 37, and reception ends when both the recording data and recording command have been received. In step S12 the CPU 31 determines if there is a block for which receiving both the recording data and the recording command is completed. If there is no data for a block for which reception is completed (step S12 returns No), the CPU 31 returns to step S11 and waits.

If a block for which reception is completed is found in the receive buffer 33 (step S12 returns Yes), the CPU 31 selects the block closest to the beginning of the completely received blocks, acquires the recording data and recording command from the receive buffer 33 (step S13), and starts recording based on the acquired recording data according to the acquired recording command (step S14). The data for the acquired block may be deleted from the receive buffer 33 at this time.

After recording starts, the CPU 31 determines if recording the block being recorded is near completion based on, for example, whether or not the distance between the end position of the block and the current position of the thermal head 57 is within a preset distance (step S15), and if the end of recording is not near (step S15 returns No), continues recording.

If the end of recording is near (step S15 returns Yes), the CPU 31 determines if recording all of the print document, that is, all blocks for one page of the print document, is completed (step S16). If recording the entire page is complete (step S16 returns Yes), the CPU 31 operates the platen roller 55 to convey the roll paper and discharge the recorded page, drives the cutter drive motor 56 to cut the paper (step S17), and ends this process.

If recording the entire page is not finished, that is, if there are other blocks to be recorded on the same page of the print document (step S16 returns No), the CPU 31 references the receive buffer 33 and determines if another data block that has been completely received but not recorded is present (step S18). If data for a received block is in the receive buffer 33 (step S18 returns Yes), the CPU 31 gets the data and recording commands for that block from the receive buffer 33, returns to step S14, and starts recording based on the recording data according to the acquired recording command continuously to the block currently being recorded. Because recording data and recording commands for the next block are acquired near the completion of recording one block, plural blocks can be recorded continuously without stopping operation.

If data for a completely received block to be recorded is not in the receive buffer 33, or if receiving data for a block to be recorded is not completed, the CPU 31 pauses the recording operation after finishing recording the block determined to be near completion in step S15 (step S20). The paper feed motor 54 and thermal head 57 stop in this step S20.

The CPU 31 then again checks the receive buffer 33 (step S21), and determines if data for another completely received block is ready (step S22). If data for another completely received block is ready (step S22 returns Yes), the CPU 31 goes to step S19, gets the data and recording commands for the block from the receive buffer 33, and returns to step S14. If data for another completely received block is not in the receive buffer 33 (step S22 returns No), the CPU 31 determines if operation timed out (step S23), and returns to step S21 and waits until receiving data for the next block is completed if operation did not time out. If this waiting time exceeds a preset time limit and operation timed out (step S23 returns Yes), the CPU 31 goes to step S17, discharges and cuts the recorded portion of the paper, and ends this process.

The printer 3 thus receives recording data and recording commands and records in block units. All of the data for the next block may not be received while recording one block when reception takes long, such as when the communication rate between the host computer 2 and the printer 3 is slow, or the amount of data in one block is significantly large compared with the communication rate, but the printer 3 stops the recording operation at a break between blocks and waits.

As known from the literature, white lines can be created at the stopping position when the printer 3 stops in the middle of recording and then resumes recording. This commonly occurs in thermal printers, but can also occur with dot impact and inkjet printers.

To avoid this, the host computer 2 segments the data for the print document at white space (non-printing data) when dividing the print document into blocks. Because any white lines produced in this case cannot be seen, recording quality does not drop. The host computer 2 can also reduce the amount of data by replacing white space in the print document data with a paper feed command, enabling the printer 3 to finish receiving data quickly even when the communication speed is slow. In addition, the host computer 2 can also enable the printer 3 to complete reception faster by dividing the data into even smaller blocks when the amount of data in one block is particularly large.

Figure 3:
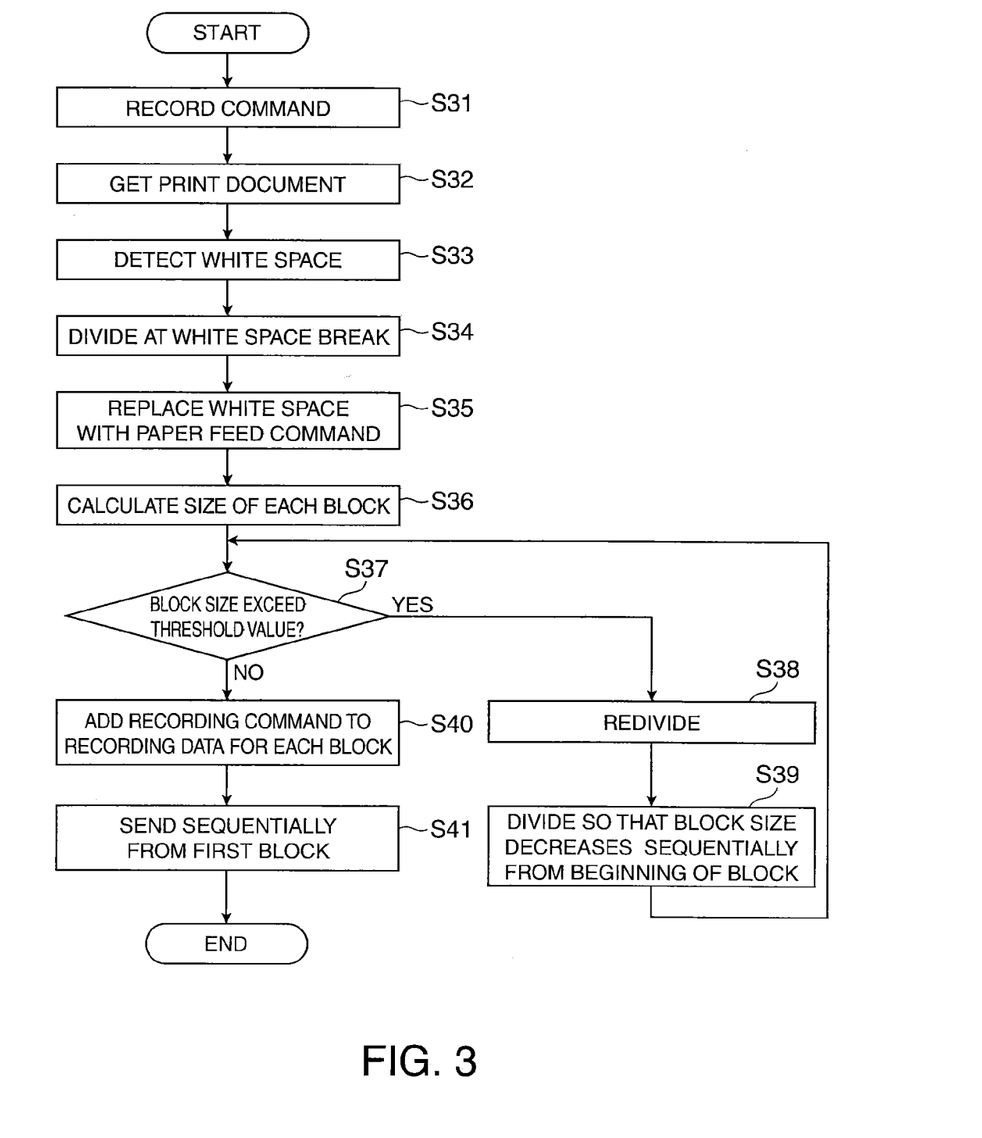
FIG. 3 is a flow chart of host computer operation.
Figure 4A:
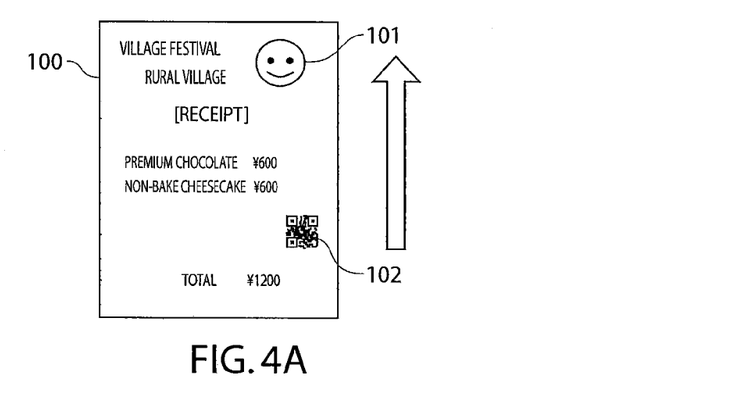
FIG. 4 describes segmenting a document to be recorded.
Figure 4B:
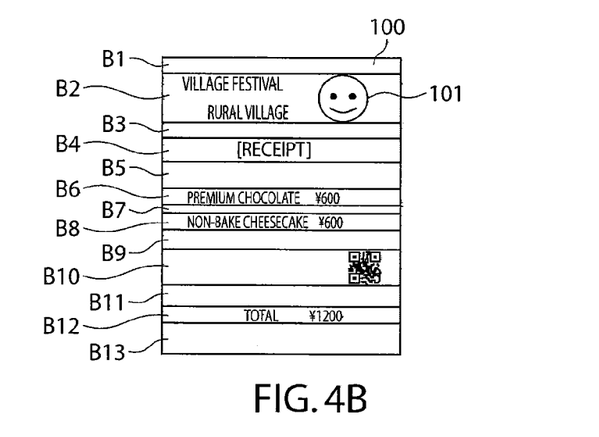
Figure 4C:
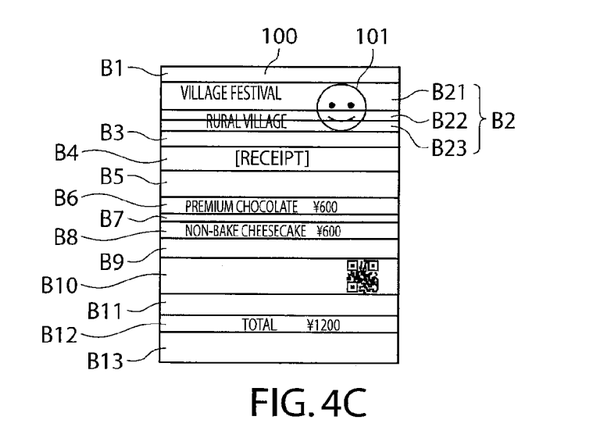

FIG. 3 is a flow chart showing the operation of the host computer 2. FIG. 4 describes dividing a print document into blocks in the operation described in FIG. 3. FIG. 4A shows an example of a print document, FIG. 4B shows an example of the print document divided into plural blocks, and FIG. 4C shows an example of redividing blocks.

The operation shown in FIG. 3 is performed after recording is instructed by an operation of the input unit 25 while running an application program stored in the storage unit 24, data for the document to be recorded is input to the driver program 24A, and the print document data is generated by a function of the driver program 24A. This operation is also rendered by a function of the driver program 24A. The CPU 21 performing the operation shown in FIG. 3 corresponds to a division control unit and a transmission control unit.

When recording is thus instructed (step S31), the CPU 21 acquires the data for the print document generated by a function of the driver program 24A (step S32), and detects white space that is perpendicular to the conveyance direction in the print document (step S33).

The CPU 21 divides the print document into plural blocks at breaks between detected white space and non-white space (step S34). White space (non-printing data) is any data such as a space or tab where nothing prints; line feeds alone; lines or blank lines composed of only line feed characters; or intervals where the paper is simply advanced. It may also be image data containing a blank image. Non-white space is any line containing data for a text, symbol, image data, or other marking that is to be recorded. The CPU 21 replaces data rendering blocks of white space with paper feed commands (step S35). While the appearance of the print document does not change as a result of step S35, the amount of recording data sent to the printer 3 is reduced by replacing spaces, line feed characters, tabs, and paper feed characters, for example, with conveyance commands.

The print document 100 shown for example in FIG. 4A contains images such as a top logo 101 and barcode 102, and plural lines of text. The conveyance direction of the recording medium when recording the print document 100 is indicated by the arrow in the figure, and the top end in the figure is recorded first.

Because this print document 100 has white space where no image or text is printed, the print document 100 is divided into 13 blocks B1 to B13 as shown in FIG. 4B when the print document 100 is divided at breaks between white space and non-white space. Of these blocks, there are seven white space blocks B1, B3, B5, B7, B9, B11, B13. These white space blocks are white space that extends perpendicularly to the conveyance direction as described above, and are parts where image and text information, for example, is not recorded perpendicularly to the conveyance direction.

The CPU 21 calculates the data size of each block output by step S34 in FIG. 3 (step S36), and determines if the size of any block exceeds a threshold value (step S37). This threshold value is preset according to the capacity of the receive buffer 33 in the printer 3, or a value that is determined based on how long the host computer 2 waited after the printer 3 buffer became full when the printer 3 and host computer 2 communicated previously, and how much data was sent to the printer 3 at that time. This threshold value is stored in the storage unit 24. The threshold value may be a fixed value, or change dynamically based on the history of data transmission from the host computer 2 to the printer 3.

If a block exceeds the threshold value (step S37 returns Yes), the CPU 21 starts a redivision process that further divides that block (step S38), and during this redivision process divides one block into a plurality of blocks that become sequentially smaller in size from the beginning of recording (step S39). When this redivision ends, the CPU 21 returns to step S37 and continues block evaluation.

In the example shown in FIG. 4B, the size of block B2 containing the top logo 101 exceeds the threshold size. The CPU 21 therefore divides block B2 as shown in FIG. 4C. In the example in FIG. 4C block B2 is divided into three blocks B21, B22, B23 with block B21 being the largest and blocks B21 and B22 successively smaller.

The method of determining the number of divisions into which one block is redivided could, for example, compare the size of the block before redivision with the threshold value. Alternatively, a value used as a reference for redivision may be stored in the storage unit 24, the first block is created so that this reference value is not exceeded, and the remaining portion is then divided so that the size of each block becomes sequentially smaller. This method is useful because there is no need for further redivision after a block is once redivided. This reference value can be determined based on the threshold value described above.

When there are no blocks exceeding the threshold value in size (step S37 returns Yes), the CPU 21 adds a recording command to the recording data for each of the plural blocks (step S40), and sends the recording data and recording commands for each block starting from the first block in the print document (step S41). Note that the procedure for sending recording data and recording commands from the host computer 2 to the printer 3 divides the recording data and recording commands to be sent into plural packets, controls transmission by alternately sending and receiving transmission requests and reception acknowledgements, and resends packets and pauses transmission as necessary.

Note that steps S37 to S39 may execute only once if the size of the redivided blocks is smaller than the threshold value, but if another block that exceeds the threshold value is found, these steps can obviously be executed again.

As described above, a recording system 1 according to this embodiment of the invention is a recording system 1 that includes a host computer 2 and a printer 3 that records recording data sent from the host computer 2 on roll paper as the recording medium. The host computer 2 divides recording data for the print document into a plurality of blocks by means of the CPU 21, and sends the recording data block by block to the printer 3. The printer 3 stores the recording data sent block by block from the host computer 2 in the order received to a receive buffer 33, acquires data for a block for which all of the recording data has been received from the receive buffer 33, and records the acquired data. The CPU 21 divides the print document so that breaks between blocks occur in white space contained in the print document.

Because the print document is divided at white space into plural blocks, and the recording data and recording commands are sent in block units from the host computer 2 to the printer 3, recording quality does not drop even if the printer 3 interrupts recording and waits until reception is completed because all of the recording data and recording commands for one block was not received in time. More specifically, because the place where the printer 3 interrupts recording overlaps white space in the print document (a place where white space is recorded), white space formed in a band due to shifting between where recording was interrupted and where recording resumes will not be apparent, and interrupting the recording operation will therefore not affect recording quality. As a result, a drop in recording quality can be prevented even if the recording operation is interrupted for reasons such as a slow communication speed.

When the recording data for one block of the print document is greater than a predetermined amount based on the size of the receive buffer 33 of the printer 3, the CPU 21 further divides the block into a plurality of blocks. More specifically, the block is further divided into a plurality of blocks of a size appropriate to the size of the receive buffer 33, such as a size that can be received in a short time. Because the size of these redivided blocks is small and the printer 3 can quickly receive and store both the recording data and recording commands in the receive buffer 33, the printer 3 does not need to wait to receive the next block of data, and recording can continue without interruption. For example, when the print document contains few white spaces and can only be divided into a few blocks, the size of one block becomes larger, but recording can continue without interruption even in this case by dividing large blocks into plural blocks. The recording operation can therefore be interrupted less frequently, and a drop in recording quality can be prevented.

When dividing one of the blocks into which a print document was divided into a further plurality of blocks, the CPU 21 creates blocks of successively smaller data size starting from the beginning of the block. When the printer 3 receives recording data and recording commands for subsequent blocks while recording the recording data in the receive buffer 33 in this case, reception can be completed quickly and the recording data and recording commands can be reliably stored without the receive buffer 33 overflowing because it takes a long time to complete recording the first block because of its large size, and the following blocks become successively smaller. As a result, the block that was created first can be recorded without interruption.

The printer 3 has a paper feed motor 54 and platen roller 55 as a paper feed mechanism for conveying roll paper, and a thermal head 57 that is a line head disposed perpendicularly to the conveyance direction, and is configured to record by means of the thermal head 57 while conveying the roll paper. Because the CPU 21 divides the print document at white space in the print document that is parallel to the alignment of the thermal head 57 (perpendicular to the conveyance direction of the roll paper used as the recording medium), the place where recording stops when the printer 3 interrupts recording is superimposed on white space parallel to the line head, and a drop in recording quality caused by this interruption does not occur. This is not limited to printers using a thermal head 57, and is also true in a printer that uses an inkjet line head.

It will be obvious to one with ordinary skill in the related art that the foregoing embodiment is but one example of the invention, and can be modified and adapted as desired without departing from the scope of the accompanying claims.

For example, the printer 3 according to the foregoing embodiment of the invention is described as having the thermal head 57 disposed perpendicular to the conveyance direction of the roll paper used as the recording medium, but the printer 3 could be configured to record by scanning the recording head perpendicularly to the recording medium conveyance direction. In this case, the CPU 21 divides the print document at white space present in the scanning direction of the recording head. When the printer configured to record by scanning the recording head perpendicularly to the recording medium conveyance direction interrupts recording, the recording head is stopped at a position superimposed on white space in the scanning direction, and recording quality does not drop due to interruption.

The recording system 1 described above divides the print document 100 to be recorded into blocks at breaks between white space and non-white space in the recording data, but the invention is not so limited. For example, the recording data could be divided at the center of the white space. In this case each block will have non-white space data (such as text and images) bracketed by white space data on both sides. Further alternatively, the recording data could be divided inside all white space data to prevent blocks consisting of only white space, or blocks of only white space could be formed by dividing the recording data near the edges of white space.

Yet further, the recording system 1 according to the foregoing embodiment is described with the host computer 2 recording documents such as the sales receipt shown in FIG. 4 one at a time according to instructions from the input unit 25, but plural print documents could be batch processed, or the operations shown in FIG. 2 to FIG. 3 could be automatically performed according to preset conditions.

An embodiment in which the interface unit 28 and interface unit 37 are connected 1:1 by wire is described above, but the invention is not so limited, and wireless communication technology such as wireless LAN or infrared data communication technology can obviously be used. A plurality of printers 3 could also be connected to a single host computer 2 using a LAN or by providing a plurality of interface units 28 in the host computer 2. A plurality of host computers 2 could also be connected to the printer 3. In this case, a 1:1 virtual connection is established between each printer 3 and host computer 2 to communicate recording data and recording commands therebetween.

The recording system 1 may be rendered with hardware corresponding to the function blocks shown in the function block diagram, but the function of plural function blocks can obviously also be rendered by one or a small number of hardware parts executing a specific program through the cooperation of software and hardware.

The host computer 2 in the foregoing embodiment is also not limited to a personal computer, and may be a computer used in a POS system or a mobile electronic terminal or other device. The specific configuration thereof, including the operating system, can also be arranged as desired, and a configuration rendering the function of the driver program 24A and the function of an application program in the operating system, for example, is also conceivable.

The printer is also not limited to a specific type of printer, and could be an inkjet printer, dot impact printer, or laser printer, for example. The invention can also be applied to a printer incorporated in another device, such as a facsimile or multifunction printer, with the printer connected to the computer of the device. Other applications are also conceivable.

A configuration in which the function of the host computer 2 in the foregoing embodiment is rendered by the control unit of an inkjet printer, dot impact printer, laser printer, or other type of printer is also conceivable. In this case, the host computer 2 sends the recording data to be recorded to the controller, which is the image data control unit of the printer, and the controller of the printer receiving the recording data to be printed divides the recording data to be recorded into plural blocks of recording data, and sends the recording data in the resulting blocks to a mechanical control unit that is the control unit for the print unit of the printer. The mechanical control unit stores the recording data for the blocks sent from the controller in the order received in a receive buffer, the print unit gets the recording data for the blocks that were completely received from the receive buffer, and prints the recording data for the acquired blocks to the recording medium. More specifically, the image data control unit of the printer corresponds to the host computer of the foregoing embodiment, and the print unit including the mechanical control unit of the printer corresponds to the recording device.

The program that is run by the CPU 21 that performs the above operation is also not limited to being stored in ROM 22 in the host computer 2, and configurations in which the program is stored in another type of storage device, storage medium, or the storage medium of an external device, and read and run therefrom by the CPU 21 are also conceivable.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A control method for a recording system including a host computer, and a recording device that records recording data sent from the host computer to a recording medium, the control method comprising steps of:

acquiring the recording data by the host computer;

detecting white space data in the recording medium;

dividing the recording data into blocks at breaks, each break being between white space and non-white space;

replacing data rendering blocks of white space with paper feed commands;

sending the blocks of recording data sequentially from the host computer to the recording device;

determining if each block exceeds a threshold value, after dividing the recording data into blocks; and sub-dividing each block that exceeds the threshold value into a plurality of blocks.

2. The control method described in claim 1, further comprising steps of:

storing the blocks of recording data sent from the host computer to a receive buffer of the recording device in the order received;

acquiring blocks of recording data that have been completely received from the receive buffer; and recording the acquired blocks of recording data to the recording medium.

3. The control method described in claim 1, wherein the threshold value changes based on a history of data transmitted from the host computer to the recording device.

4. The control method described in claim 1, wherein the sub-divided blocks are sequentially smaller in size.

5. The control method described in claim 1, further comprising: determining if each sub-divided block exceeds the threshold value, after the sub-dividing step.

6. The control method described in claim 1, further comprising: adding a recording command to each block of recording data, when there are no blocks that exceed the threshold value.

* * * * *